United States Patent
Schlemmer et al.

(10) Patent No.: US 10,550,720 B2
(45) Date of Patent: Feb. 4, 2020

(54) GUIDE VANE SEGMENT

(71) Applicant: MTU Aero Engines AG, Munich (DE)

(72) Inventors: Markus Schlemmer, Mainburg/Sandelzhausen (DE); Andreas Hartung, Munich (DE); Karl-Hermann Richter, Markt Indersdorf (DE); Herbert Hanrieder, Hohenkammer (DE)

(73) Assignee: MTU Aero Engines AG, Munich (DE)

( * ) Notice: Subject to any disclaimer, the term of this patent is extended or adjusted under 35 U.S.C. 154(b) by 284 days.

(21) Appl. No.: 15/483,565

(22) Filed: Apr. 10, 2017

(65) Prior Publication Data

US 2017/0292403 A1  Oct. 12, 2017

(30) Foreign Application Priority Data

Apr. 11, 2016  (DE) .................. 10 2016 205 997

(51) Int. Cl.
  *F01D 25/06*  (2006.01)
  *F01D 9/04*  (2006.01)
  (Continued)

(52) U.S. Cl.
  CPC ............. *F01D 25/06* (2013.01); *F01D 9/041* (2013.01); *F04D 29/542* (2013.01);
  (Continued)

(58) Field of Classification Search
  CPC ... F01D 25/06; F01D 9/04; F01D 5/26; F01D 9/041; F01D 5/10; F01D 5/24; F01D 9/02;
  (Continued)

(56) References Cited

U.S. PATENT DOCUMENTS 1,833,754 A * 11/1931 Paget ................. F01D 5/16
  416/215
2,349,187 A *  5/1944 Meyer ................ F01D 5/16
  416/190
(Continued)

FOREIGN PATENT DOCUMENTS

DE  102009010185 A1 *  8/2010 ............. F01D 25/06
EP     2484870        8/2012
(Continued)

*Primary Examiner* — Sizo B Vilakazi
*Assistant Examiner* — Brian R Kirby
(74) *Attorney, Agent, or Firm* — Davidson, Davidson & Kappel, LLC

(57) ABSTRACT

A guide vane segment for a turbomachine stage that has an inner ring segment (10) and a plurality of guide vanes (21-25) that are configured on the inner ring segment; at and/or in at least one detuning region (A; B) of the inner ring segment, that extends circumferentially in a portion of the inner ring segment that, from one end face (11; 12) of the inner ring segment to an inner guide vane (22; 24) that is circumferentially adjacent to an outermost guide vane (21; 25) adjacent to the end face and/or extends at most over an outermost third of a length (L) of the inner ring segment bounded by an end face (11; 12) of the inner ring segment, at least one cavity (112) is configured which contains at least one impulse element (100) with clearance of motion for providing impact contacts.

18 Claims, 1 Drawing Sheet

(51) Int. Cl.
*F04D 29/54* (2006.01)
*F04D 29/66* (2006.01)

(52) U.S. Cl.
CPC ...... *F04D 29/668* (2013.01); *F05D 2220/323* (2013.01); *F05D 2260/961* (2013.01)

(58) Field of Classification Search
CPC ... F01D 5/225; F01D 5/22; F01D 5/18; F01D 5/14; F01D 5/16; F04D 29/668; F04D 29/542; F05D 2260/96; F05D 2260/961; F05D 2220/323; Y02T 50/676; Y02T 50/671; Y10T 29/49336; F05B 2260/96; F05B 2260/964
USPC .................................. 415/119; 416/145, 500
See application file for complete search history.

(56) References Cited

U.S. PATENT DOCUMENTS

| | | | | |
|---|---|---|---|---|
| 2,462,961 | A * | 3/1949 | Harker | B64C 11/008 |
| | | | | 416/229 R |
| 2,930,581 | A * | 3/1960 | Klint | F01D 5/26 |
| | | | | 416/219 R |
| 3,881,844 | A * | 5/1975 | Hennessey | F01D 5/22 |
| | | | | 416/145 |
| 5,205,713 | A * | 4/1993 | Szpunar | F01D 5/26 |
| | | | | 416/193 A |
| 5,219,144 | A * | 6/1993 | Fox | F16F 7/10 |
| | | | | 248/562 |
| 5,369,882 | A * | 12/1994 | Dietz | F01D 5/22 |
| | | | | 29/889.1 |
| 6,125,977 | A * | 10/2000 | Nekomoto | E04B 1/985 |
| | | | | 188/378 |
| 6,450,769 | B2 * | 9/2002 | Szwedowicz | F01D 5/22 |
| | | | | 416/190 |
| 6,827,551 | B1 * | 12/2004 | Duffy | F01D 5/16 |
| | | | | 415/119 |
| 6,851,932 | B2 * | 2/2005 | Lagrange | F01D 5/22 |
| | | | | 416/190 |
| 8,157,507 | B1 * | 4/2012 | Coffin | F01D 5/26 |
| | | | | 415/119 |
| 9,334,740 | B2 * | 5/2016 | Kellerer | F01D 5/16 |
| 9,371,733 | B2 | 6/2016 | Hartung | |
| 10,041,359 | B2 * | 8/2018 | Brandl | F01D 5/147 |
| 2010/0021303 | A1 * | 1/2010 | Nielsen | F03D 1/065 |
| | | | | 416/145 |
| 2012/0121423 | A1 * | 5/2012 | Honkomp | F01D 11/006 |
| | | | | 416/190 |
| 2013/0058785 | A1 * | 3/2013 | Kellerer | F01D 5/16 |
| | | | | 416/1 |
| 2013/0195611 | A1 * | 8/2013 | Retze | F01D 25/06 |
| | | | | 415/1 |
| 2013/0223990 | A1 * | 8/2013 | Cloarec | F04D 29/542 |
| | | | | 415/119 |
| 2014/0348639 | A1 | 11/2014 | Stiehler et al. | |
| 2014/0348657 | A1 * | 11/2014 | Stiehler | F01D 5/10 |
| | | | | 416/190 |
| 2015/0167478 | A1 | 6/2015 | Hartung | |
| 2015/0167479 | A1 | 6/2015 | Hartung et al. | |
| 2016/0010462 | A1 | 1/2016 | Stiehler et al. | |
| 2016/0146041 | A1 | 5/2016 | Hartung | |
| 2016/0222821 | A1 * | 8/2016 | Klinetob | F01D 9/041 |
| 2017/0292387 | A1 * | 10/2017 | Schlemmer | F01D 5/16 |

FOREIGN PATENT DOCUMENTS

| | | | |
|---|---|---|---|
| EP | 2806105 | 11/2014 | |
| EP | 2806106 | 11/2014 | |
| EP | 2966262 | 1/2016 | |
| EP | 3023584 | 5/2016 | |
| EP | 2884050 | 3/2017 | |
| WO | WO 2012/095067 A1 | 7/2012 | |
| WO | WO-2012095067 A1 * | 7/2012 | ............... F01D 5/16 |

* cited by examiner

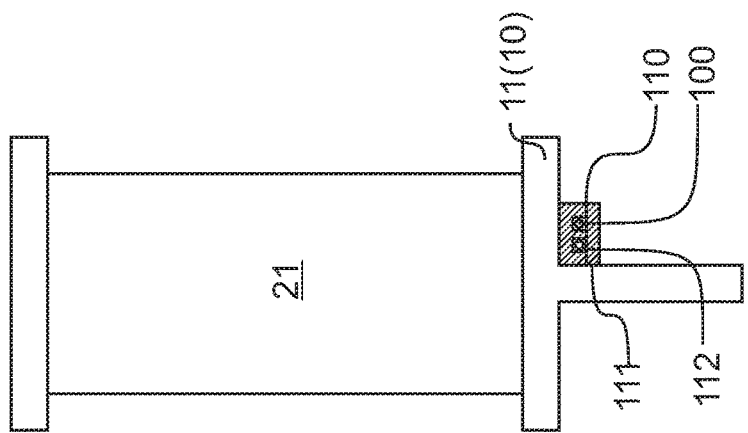
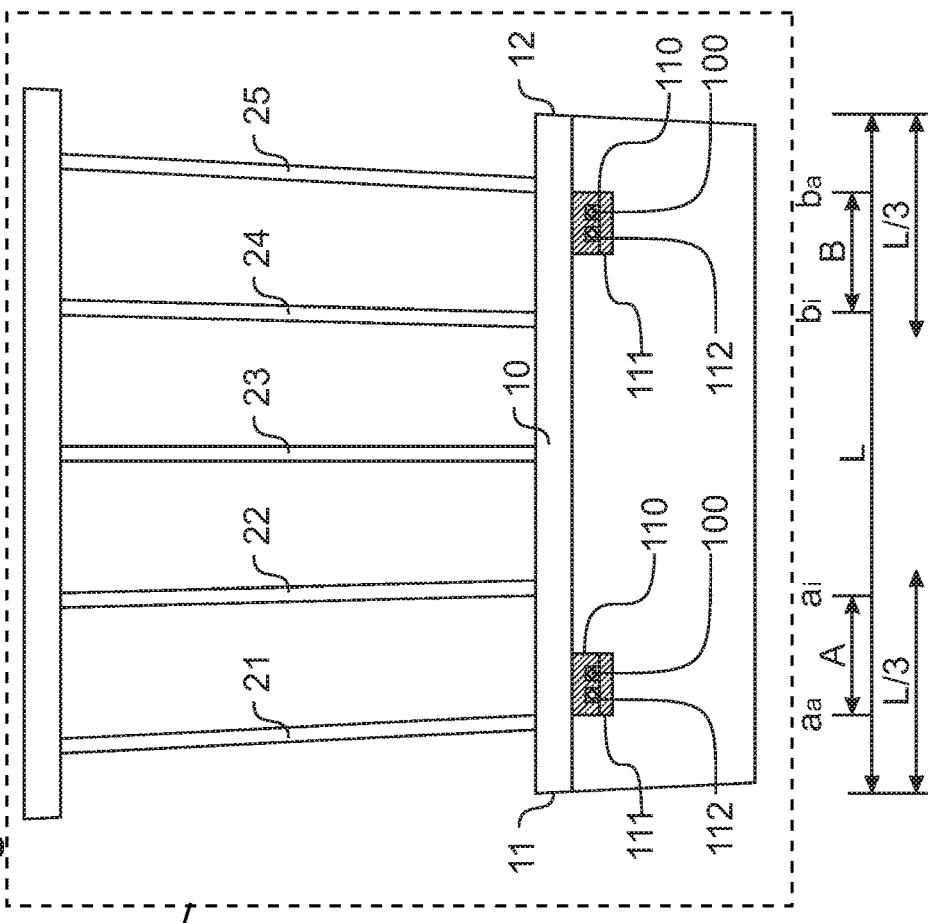

GUIDE VANE SEGMENT

This claims the benefit of German Patent Application DE 10 2016 205 997.1, filed Apr. 11, 2016 and hereby incorporated by reference herein.

The work leading to this invention was funded in accordance with Grant Agreement no. CSJU-GAM-SAGE-2008-001 in the course of The European Union's Seventh Framework Program (FP7/2007-2013) for The Clean Sky Joint Technology Initiative.

The present invention relates to a guide vane segment for a turbomachine stage, a turbomachine stage, in particular a compressor or turbine stage, having the guide vane segment, as well as a turbomachine, in particular a gas turbine, having the turbomachine stage.

BACKGROUND

From the Applicant's own WO 2012/095067 A1, it is known to configure impulse elements on guide vanes of a gas turbine for contacting the vanes by imparting impacts thereto.

It is hereby possible to realize the Applicant's novel concept for reducing unwanted vibrations that essentially is not based on dissipating friction, but on detuning natural modes and natural frequencies in response to impacts by the impulse elements. For further details on this detuning concept, the present disclosure also expressly makes reference to the WO 2012/095067 A1 and to the contents thereof.

SUMMARY OF THE INVENTION

It is an object of an embodiment of the present invention to improve the performance characteristics, in particular the vibration characteristics of a turbomachine, in particular of a gas turbine.

The present invention provides a guide vane and a turbomachine stage, in particular a compressor stage or a turbine stage, having one or a plurality of guide vane segments described here, respectively a turbomachine, in particular a gas turbine, in particular an aircraft engine gas turbine, having one or more such turbomachine stages.

An embodiment of the present invention provides that a guide vane segment or guide vane assembly, in particular guide vane cluster, for a turbomachine stage, in particular a compressor stage or turbine stage of a turbomachine, in particular of a gas turbine, in particular of an aircraft engine gas turbine, in particular at least one guide vane segment of at least one turbomachine stage, in particular compressor stages or turbine stages, for or of a turbomachine, in particular gas turbine, in particular aircraft engine gas turbine, have an inner ring segment and a plurality of guide vanes, in particular guide vane blades and/or for deflecting flow and/or for converting kinetic energy to pressure energy, that are configured on this inner ring segment.

In an embodiment, the inner ring segment is configured radially inwardly from the guide vanes of the guide vane segment and/or integrally formed therewith or non-destructively or destructively detachably joined thereto.

In an embodiment, one or a plurality of guide vane segments described here and/or one or a plurality of further guide vane segments are circumferentially, mutually adjacently disposed and form a guide vane cascade, in particular an inlet and/or outlet guide vane cascade of the turbomachine stage or are provided or adapted for this purpose.

In an embodiment, the inner ring segments of the circumferentially, mutually adjacent guide vane segments are sealed from each other, in particular by non-destructively or destructively detachably attached sealing plates, and/or radially (inwardly) bound a flow channel of the turbomachine (stage) or are adapted for this purpose; in particular, they may form a (segmented) inner ring of the guide vane array or be adapted for this purpose.

In the present case, the directional indication "axial" refers in particular to an installed position of the guide vane segment and/or to a direction parallel to an axis of rotation, respectively the (main) machine axis of the turbomachine (stage); the directional indication "radial" refers in particular to an installed position of the guide vane segment and/or to a direction orthogonal to an or the axis of rotation, respectively the (main) machine axis of the turbomachine (stage); the directional indication "circumferentially" refers in particular to an installed position of the guide vane segment and/or to a circumferential direction about an or the axis of rotation, respectively (main) machine axis of the turbomachine (stage), and/or to a direction tangential to a (main) direction of rotation of the turbomachine (stage).

In an embodiment of the present invention,
one or a plurality of cavities containing one or a plurality of impulse elements (in each case) with clearance of motion are disposed for providing impact contacts
(circumferentially) at and/or in at least one region of the inner ring segment that extends circumferentially
in one portion of the inner ring segment (circumferentially) that extends (circumferentially) from an end face of the inner ring segment (circumferentially) to a guide vane, referred to in the present case without limiting universality as (an) inner guide vane, that is circumferentially, in particular directly adjacent to a guide vane, referred to in the present case without limiting universality as (an) outermost guide vane, that is (circumferentially, in particular directly) adjacent to the/ this end face, and/or
extends (circumferentially) at most over a (circumferentially) outermost third, in particular fourth, in particular fifth of an, in particular maximum length or extent of the inner ring segment (circumferentially) bounded by an, in particular the same end face of the inner ring segment, and, in the present case, is referred to as (a) detuning region; in particular
at and/or in a first detuning region of the inner ring segment (circumferentially) that extends circumferentially in a first portion of the inner ring segment that extends (circumferentially) from a first end face of the inner ring segment to an inner guide vane that is circumferentially, in particular directly adjacent to a first outermost guide vane that is (circumferentially, in particular directly) adjacent to the first end face,
and/or extends (circumferentially) at most over a first outermost third, in particular fourth, in particular fifth of the length of the inner ring segment (circumferentially) bounded by an or the first end face of the inner ring segment, as well as
at and/or in a (circumferentially opposite) second detuning region of the inner ring segment (in the circumferential direction) that extends circumferentially within a second portion of the inner ring segment circumferentially opposite the first portion, that extends (circumferentially) from a second end face of the inner ring segment circumferentially opposite the first end face to an inner guide vane that is circumferentially, in particular directly adjacent to a second outermost guide vane (circumferentially, in particular directly) adjacent to the second end face, and/or extends (circumferentially) at most over a second outermost third, in particular fourth, in particular fifth of the length of the inner ring segment (circumferentially) bounded by one or the second end face of the inner ring segment.

In an embodiment, the impulse element(s) is/are provided for inducing impact contacts, respectively, during operation, for contacting the (respective) cavity, respectively the walls thereof by imparting impacts thereto, respectively is/are designed for this purpose or accordingly. In the present case, in particular as is customary in the art, an impact contact is understood to be a short-duration or pulse-like, in particular at least essentially completely elastic and/or stochastic or random contact. In this regard, reference is also made to WO 2012/095067 A1.

Surprisingly, it has been found that, by circumferentially positioning (cavities containing) impulse elements near one or both end faces, it is especially possible to very effectively detune or reduce vibrational modes of the guide vane segment as a whole (what are generally referred to as "cluster modes").

In an embodiment, the or at least one detuning region is identical to the portion in which it extends (circumferentially). Thus, in particular, the or at least one detuning region may extend, in particular maximally from the end face to the inner vane that is adjacent to the outermost guide vane adjacent to this end face; thus, in particular, the first detuning region extends from the first end face to the inner vane adjacent to the first outermost guide vane; and/or the second detuning region extends from the second end face to the inner vane adjacent to the second outermost guide vane.

In another embodiment, the or at least one detuning region is (circumferentially) shorter than the portion within which it extends (circumferentially). Thus, in particular, a (circumferentially) outer boundary of the at least one (in particular of the first or second) detuning region (circumferentially) facing the (in particular first or second) end face may be spaced apart from this end face toward the inner vane; and/or an inner boundary of the or of at least one (in particular of the first or second) detuning region facing away from the (in particular first or second) end face may be (circumferentially) spaced apart from the inner vane toward the end face.

In an embodiment, the or at least one of the detuning region(s) extends (circumferentially) in each case from an inner boundary/from an inner boundary thereof facing away from the end face at most to the outermost guide vane; in particular, the first detuning region extends (circumferentially) from an inner boundary/from the inner boundary thereof facing away from the first end face at most to the first outermost guide vane; and/or the second detuning region extends (circumferentially) from an inner boundary/from the inner boundary thereof facing away from the second end face at most to the second outermost guide vane.

Surprisingly, it has been found that, by positioning (cavities containing) impulse elements between a (circumferentially) outermost guide vane and the inner guide vane (circumferentially directly adjacent) thereto, it is possible to very effectively detune or reduce cluster modes, in particular.

In an embodiment, an outer boundary of the or of at least one detuning region facing the end face (in the circumferential direction) is spaced apart (circumferentially) from the end face by at least 0.5 mm, in particular by at least 1 mm; in particular, an outer boundary of the first detuning region facing the first end face (in the circumferential direction) is spaced apart by at least 0.5 mm, in particular by at least 1 mm, from the first end face; and/or an outer boundary of the second detuning region facing the second end face (in the circumferential direction) is spaced apart by at least 0.5 mm, in particular by at least 1 mm, from the second end face.

In an embodiment, this makes it advantageously possible to attach the aforementioned sealing plates, in particular in sealing plate slots of the inner ring segment, without any spatial conflict with the cavities.

In an embodiment, at least 25% of all impulse elements configured at and/or in the inner ring segment are located at and/or in the or one of the detuning regions. In another embodiment, at least 50%, in particular at least 75%, in particular at least 90%, in particular 100% of all of the impulse elements located at and/or in the inner ring segment are configured at and/or in a or the detuning region alone or at and/or in the first and second detuning region together.

Surprisingly, it has been found that, by configuring such a number, in particular a plurality of the (cavities containing) impulse elements, in particular all (cavities containing) impulse elements at and/or in a detuning region alone or in two detuning regions together, it is possible to detune or reduce cluster modes very effectively.

In an embodiment, the or one impulse element or a plurality thereof is/are (each) spherical in shape and/or is/are fabricated of metal, $Al_2O_3$ and/or of $CrO_2$.

This makes it possible to realize an advantageous impact contact.

In an embodiment, exactly one impulse element is located (in each case) in the or in one cavity or in a plurality thereof.

This makes it possible to realize advantageous single impact contacts.

In one variant, it is also additionally or alternatively conceivable, purely theoretically, to configure two or more impulse elements (in each case) in the or in one cavity or in a plurality thereof.

Impact contacts may also be hereby realized between impulse elements.

In an embodiment, the or one impulse element or a plurality thereof is/are (each) configured to be unrestrained or freely movable in a cavity which, in a further refinement, may be air-filled.

This makes it possible to realize an advantageous impact contact.

In an embodiment, the or one cavity or a plurality thereof is/are (each) configured in one housing or in a plurality thereof that is/are produced separately (from the inner ring segment).

One housing or a plurality thereof may hereby (each) have one cavity or a plurality thereof that at least partially contain(s) impulse elements and/or be non-destructively detachably or destructively detachably attached to or in the inner ring segment, respectively to the, in particular first and or second detuning region thereof, in particular on a side facing away from the guide vane. Additionally or alternatively, in an embodiment, one cavity or a plurality thereof of one housing or of a plurality thereof, which at least partially contain impulse elements, may (each) be sealed airtight, in particular by one, in particular shared cover.

In an embodiment, exactly one housing or two or more housings are configured in each case at or in the detuning region(s), in particular at or in the first and/or the second detuning region.

Surprisingly, it has been found that this may hereby make it especially possible to very effectively detune or reduce cluster modes.

In an embodiment, the or one impulse element has or a plurality thereof (each) have a mass of at least 0.01 grams (g), in particular of at least 0.02 g, and/or at most of 0.05 g, in particular at most of 0.03 g.

Additionally or alternatively, in an embodiment, the or one impulse element has or a plurality thereof (each) have an, in particular a minimum or maximum diameter of at least 1 mm and/or of at most of 5 mm, in particular at 20° C.

Additionally or alternatively, in an embodiment, the clearance of motion of the or one impulse element or of a plurality thereof (in each case) is at least 0.01 mm, in particular at least 0.1 mm, and/or at least 1% of a minimum diameter of this impulse element, and or at most 10 mm, in particular at most 1 mm, and/or at most 100% of a maximum diameter of this impulse element, in particular at 20° C.

Surprisingly, it has been found that these parameters or boundary values, in each case already individually, in particular, however, in a combination of two or more of these parameters or boundary values, may make it very advantageously possible to detune or reduce cluster modes.

In an embodiment, a detuning region or portion, which extends to a guide vane, extends (circumferentially) to an, in particular inner ring segment-proximate profile section of this guide vane, in particular of a pressure or suction side of the guide vane, in particular of the inner ring segment-proximate profile section thereof.

In an embodiment, the or one impulse element or a plurality thereof is/are configured or used for detuning cluster modes of the guide vane segment, in particular using one or a plurality of the parameters explained above and/or experimentally or by simulation.

BRIEF DESCRIPTION OF THE DRAWINGS

Other advantageous embodiments of the present invention will become apparent from the dependent claims and the following description of preferred embodiments. To this end, the drawing shows, partly in schematic form, in:

FIG. 1: a guide vane segment of a turbomachine in accordance with a variant of the present invention in an axial plan view; and FIG. 2: the guide vane segment in a lateral view in the circumferential direction.

DETAILED DESCRIPTION

FIG. 1 shows schematically a guide vane segment of a turbomachine 1000 shown schematically as an aircraft engine gas turbine, in accordance with a variant of the present invention in an axial plan view; FIG. 2 shows a lateral view in the circumferential direction.

The guide vane segment has an inner ring segment 10 and a plurality of guide vanes 21, 22, 23, 24, 25 that are integrally formed with inner ring segment 10.

Attached in each case to a first detuning region A (to the left in FIG. 1) of inner ring segment 10 and to a second detuning region B (to the right in FIG. 1) of inner ring segment 10 is a separately produced housing 110 having a plurality of air-filled cavities 112 in each of which a spherical impulse element 100 is configured unrestrainably and with clearance of motion for inducing impact contacts, and which are sealed airtight by a shared cover 111.

First detuning region A extends circumferentially (horizontally in FIG. 1; orthogonally to the image plane of FIG. 2) between a first outermost guide vane 21 and inner guide vane 22 adjacent thereto and thus, in particular, in a (left in FIG. 1) portion of inner ring segment 10 that extends from a first end face 11 of inner ring segment 10 to inner guide vane 22, as well as circumferentially at most over a first outermost third of a length L of inner ring segment bounded by first end face 11 of inner ring segment 10, in particular at most from inner boundary a, thereof facing away from first end face 11, to first outermost guide vane 21. Outer boundary $a_a$ thereof facing first end face 11 is spaced apart from first end face 11 by at least 1 mm.

Analogously, second detuning region B extends circumferentially (horizontally in FIG. 1; orthogonally to the image plane of FIG. 2) between a second outermost guide vane 25 and inner guide vane 24 adjacent thereto and thus, in particular, in a (right in FIG. 1) portion of inner ring segment 10 that extends from a second end face 12 of inner ring segment 10 to this inner guide vane 24, as well as at most over a second outermost third of length L bounded by second end face 12 of inner ring segment 10, in particular at most from inner boundary $b_i$ thereof facing away from second end face 12 thereof, to second outermost guide vane 25. Outer boundary $b_a$ thereof facing second end face 12 is spaced apart from second end face 12 by at least 1 mm.

Although exemplary embodiments are explained in the preceding description, it should be noted that many modifications are possible.

Thus, in particular, it is also possible for only one housing 110 having cavities 112, respectively impulse elements 100 accommodated therein to be provided; or for the guide vane segment to only have one single detuning region (A or B).

Similarly, in one variation, cavities 112 may also be directly formed in inner ring segment 10, respectively impulse elements 100 directly configured in inner ring segment 10 without a separately produced housing 110.

It should also be appreciated that the exemplary embodiments are merely examples, and are in no way intended to restrict the scope of protection, the uses or the design. Rather, the foregoing description provides one skilled in the art with a guideline for realizing at least one exemplary embodiment, various modifications being possible, particularly with regard to the function and configuration of the described components, without departing from the scope of protection as is derived from the claims and the combinations of features equivalent thereto.

LIST OF REFERENCE NUMERALS

10 inner ring segment
11 first end face
12 second end face
21 first outermost guide vane
22 inner guide vane
23 guide vane
24 inner guide vane
25 second outermost guide vane
100 impulse element
110 housing
111 cover
112 cavity
1000 aircraft engine gas turbine
A first detuning region
$a_{a/i}$ outer/inner boundary
B second detuning region
$b_{a/i}$ outer/inner boundary
L length

What is claimed is:

1. A guide vane segment for a turbomachine stage comprising:
    an inner ring segment;
    a plurality of guide vanes configured on the inner ring segment; and at least one cavity containing at least one impulse element with clearance of motion for providing impact contacts, the at least one cavity being at or in at least one detuning region of the inner ring segment;

the at least one detuning region extending circumferentially in a portion of the inner ring segment from an end face of the inner ring segment to an inner guide vane of the guide vanes circumferentially adjacent to an outermost guide vane of the guide vanes adjacent to the end face or extending at most over an outermost third of a length of the inner ring segment bounded by the end face;

wherein the at least one impulse element is spherical in shape and wherein a clearance of motion of the at least one impulse element is at most 10 mm or at most 100% of a maximum diameter of the impulse element.

2. The guide vane segment as recited in claim 1 wherein the detuning region extends from an inner boundary facing away from the end face at most to the outermost guide vane.

3. The guide vane segment as recited in claim 1 wherein an outer boundary of the detuning region facing the end face is spaced apart from the end face by at least 0.5 mm.

4. The guide vane segment as recited in claim 1 wherein at least 25% of all impulse elements configured at or in the inner ring segment are located at or in the detuning region.

5. The guide vane segment as recited in claim 1 wherein exactly one impulse element or at least two impulse elements of the at least one impulse element are located in at least one cavity.

6. The guide vane segment as recited in claim 1 wherein the at least one impulse element is accommodated unrestrainably in a cavity.

7. The guide vane segment as recited in claim 1 wherein the at least cavity is configured in a separately produced housing.

8. The guide vane segment as recited in claim 7 wherein the at least one cavity is air-tight.

9. The guide vane segment as recited in claim 1 wherein the impulse element has a mass of at least 0.01 g or of at most of 0.05 g.

10. The guide vane segment as recited in claim 1 wherein the impulse element has a minimum or maximum diameter of at least 1 mm or of at most 5 mm.

11. The guide vane segment as recited in claim 1 wherein a clearance of motion of the at least one impulse element is at least 0.01 mm or at least 1% of a minimum diameter of the impulse element.

12. The guide vane segment as recited in claim 1 wherein the at least one impulse element is designed for detuning cluster modes of the guide vane segment.

13. A turbomachine stage comprising the guide vane segment as recited in claim 1.

14. A compressor or turbine stage comprising the turbomachine stage as recited in claim 13.

15. A turbomachine comprising the turbomachine stage as recited in claim 13.

16. A gas turbine comprising the turbomachine as recited in claim 15.

17. An aircraft engine gas turbine comprising the gas turbine as recited in claim 16.

18. A guide vane segment for a turbomachine stage comprising: an inner ring segment; a plurality of guide vanes configured on the inner ring segment; and at least two cavities each containing at least one impulse element with clearance of motion for providing impact contacts, the at least two cavities being at or in at least one detuning region of the inner ring segment; a first detuning region extending circumferentially in a portion of the inner ring segment from an end face of the inner ring segment to an inner guide vane of the guide vanes circumferentially adjacent to an outermost guide vane of the guide vanes adjacent to the end face or extending at most over an outermost third of a length of the inner ring segment bounded by the end face, at least a first of the two cavities being in the first detuning region; and a second detuning region extending circumferentially in a portion of the inner ring segment between a second outermost guide vane of the guide vanes and a second inner guide vane of the guide vanes circumferentially adjacent to the second outermost guide vane, a second of the cavities being in the second detuning region.

* * * * *